Figure 1:
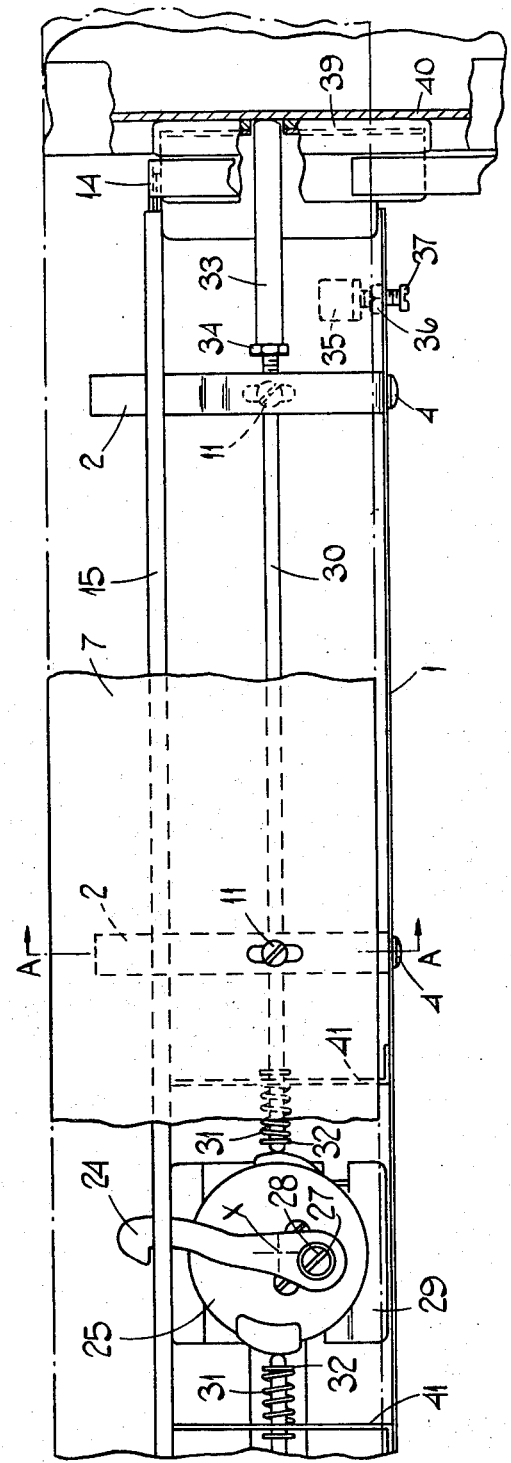

United States Patent [19]
Craven et al.

[11] 4,134,611
[45] Jan. 16, 1979

[54] FOLDING ROOF

[75] Inventors: William R. Craven, Birmingham; Leslie Lloyd, West Bromwich, both of England

[73] Assignee: Endrust Holdings Limited, Birmingham, England

[21] Appl. No.: 831,517

[22] Filed: Sep. 8, 1977

[30] Foreign Application Priority Data
Sep. 16, 1976 [GB] United Kingdom ............... 38314/76

[51] Int. Cl.² .............................................. B60J 7/10
[52] U.S. Cl. .............................................. 296/137 C
[58] Field of Search ............ 296/137 C, 137 D, 137 E

[56] References Cited
U.S. PATENT DOCUMENTS

| 2,025,874 | 12/1935 | Lange | 296/137 C |
| 3,658,378 | 4/1972 | Sutren | 296/137 C |
| 3,666,318 | 5/1972 | Butler | 296/137 C |

Primary Examiner—Robert R. Song

[57] ABSTRACT

A folding roof comprises a flexible cover anchored at its rear to a frame in an opening in a motor vehicle roof. The front of the cover is mounted on a rigid plate carried by lifting brackets rockably engaged with a front cross member longitudinally slidable in the frame. Cam blocks at the front end of the frame are engaged by the lifting brackets so that when the front cross member is moved to a roof-closed position, the lifting brackets, and thus the plate, are urged downwardly by the cam blocks so as to seal the front of the cover with the vehicle roof.

11 Claims, 3 Drawing Figures

FOLDING ROOF

This invention relates to a folding roof assembly particularly, but not exclusively, for mounting in motor vehicle roofs.

According to the present invention, there is provided a folding roof assembly for closing an opening in a surface, said assembly comprising a flexible cover, cross-members slidable on guides extending along longitudinal side edges of the opening, the cross-members supporting the flexible cover so that the latter is movable between open and closed positions, and a mechanism carried by the front cross-member for securing the cover in its closed position and for tensioning the cover, said mechanism including (a) a relatively rigid member to which the front of the flexible cover is secured, said relatively rigid member being mounted for sliding movement with the front cross-member relative to the guides but being movable relative to the front cross-member towards and away from a sealed position in which the relatively rigid member is sealed against the surface of the front end of the opening when the front cross-member is adjacent the front end of the opening (b) a manually operable retainer device which is engageable with an abutment at the front end of the opening to retain the cover in its closed position, and (c) at least one element to which the relatively rigid member is secured, said at least one element co-operating with a respective part at the front end of the opening during movement of the cover into its closed position to move the relatively rigid member into its sealing position.

Most advantageously, said at least one element and said respective part co-operate with one another with a camming action.

In a preferred embodiment, a plurality of said elements are provided in spaced apart relationship along the front cross-member.

Conveniently, each said respective part provides a cam surface and each element provides the cam follower engageable with said cam surface.

It is preferred for the relatively rigid member to be mounted on the front cross-member through the intermediary of said at least one element.

Preferably, each said respective part is adjustable in position relative to the opening.

In a preferred embodiment of the folding roof assembly, the manually operable retainer device is also arranged to cause at least one locking member to project from the cross-member laterally of the opening to permit the cover to be locked against movement whereby, if desired, the cover can be locked in its open position or in a position intermediate its open and closed positions.

Preferably, the or each locking member comprises a rod which extends longitudinally of the cross-member and is slidable relative thereto, the rod having an inner end engaged with a cam movable by the manually operable retainer device and an outer end which is engageable with a part on one of the longitudinal side edges of the opening.

Conveniently, the or each rod is of adjustable length.

Figure 2:
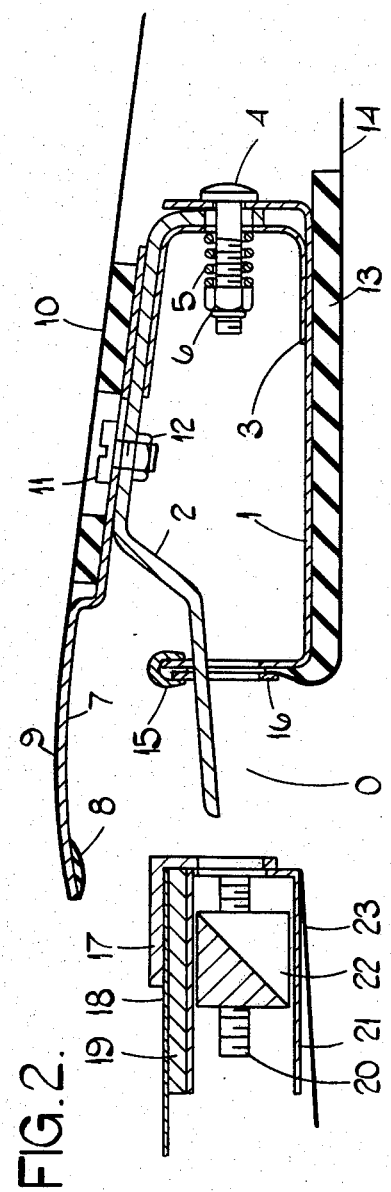
Figure 3:
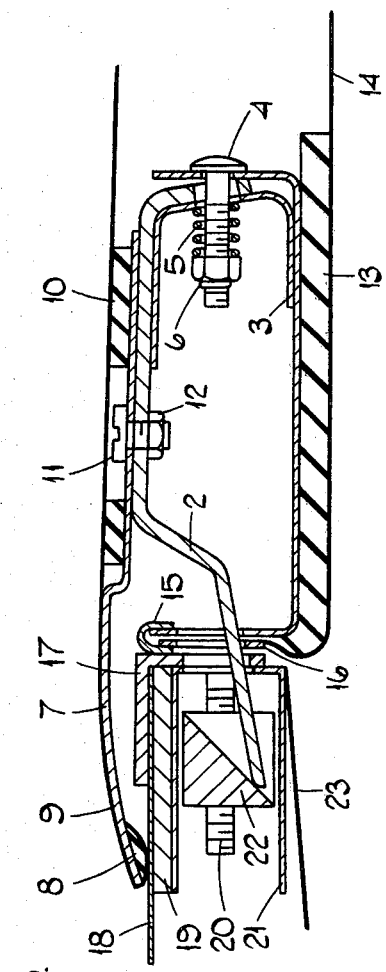

An embodiment of the present invention, will now be described, by way of example, with reference to the accompanying drawings, in which:

FIG. 1 is a plan view, partly in section, of the front end of one embodiment of a folding roof assembly according to the present invention, FIG. 2 is a section on the line AA of FIG. 1 showing the folding roof assembly adjacent a closed position thereof, and FIG. 3 is a section on the line AA of FIG. 1 showing the folding roof assembly in its closed position.

The folding roof assembly illustrated in the drawings is for mounting in a metal roof 18 of a private road vehicle. The assembly comprises a flexible, polyvinylchloride cover 9 which is anchored at its rear end (not shown) to the rear end of a frame surrounding an opening 0 in the roof 18 to be closed by the covering. The cover 9 is supported by a plurality of spaced cross-members 1 (only the front one of which is illustrated). Apart from the front cross-member, the remaining cross-members are basically in the form of relatively rigid rods or bars which extend across the opening 0 to engage in opposed side rails 40 (see FIG. 1) forming part of the aforementioned frame and extending along the longitudinal side edges of the opening 0. The cross-members 1 are slidable relative to the rails 40, fore and aft relative to the opening. The precise manner in which the cover 9 is mounted on the cross-members 1, apart from the front cross-member 1, will not be described in this specification. However, it is to be appreciated that rearward sliding movement of the cross-members 1 causes the cover 9 to be folded back on itself so that the opening 0 in the roof 18 is exposed whilst forward movement of the cross-members 1 causes the cover 9 to be unfolded to close the opening. The cover 9 is shown completely closed in FIG. 3. In order to assist in the sliding movement of the cross-members 1 relative to the side rails 40 (which define guides), the portions of the cross-members 1 which engage with the side rail are formed of a low friction material. The front cross-member 1 is provided with such portions in the form of polypropylene slides 39 (only one shown — see FIG. 1).

The folding roof assembly further comprises a mechanism for securing the cover 9 in its closed position and for tensioning the cover 9. This mechanism includes a relatively rigid, metal plate 7 which extends longitudinally of the front cross-member 1 across an open top thereof and which overlaps the longitudinal side edges of the opening 0 so as to lie above the opening 0. The front edge of the cover 9 is secured to the plate 7. The plate 7 is attached to four lifting brackets 2 (only two shown by respective screws 11 and nuts 12 which permit sliding movement in the fore and aft direction of the cover plate 7 relative to the brackets 2. Each bracket 2 is, in turn, carried by the front cross-member 1 through the intermediary of a respective screw 4 and associated self-locking nut 6 and coil spring 5. A sheet metal lifting spring 3 is also associated with each bracket 2. The effect of the springs 3 and 5 and the screws 4 is to urge the brackets 2 and thus the cover plate 7 resiliently upwardly into the position illustrated in FIG. 2. The cover plate 7 is provided with a self-adhesive rubber sealing strip 8 along the underside of its forward edge and rubber packing strips 10 are provided on either side of the screws 11 to prevent damage to the cover 9. The front edge of the front cross-member 1 has four openings therein through which pass extensions of the lifting brackets 2. An apertured trim bezel 16 extends over the front edge of the front cross-member 1 and a resilient trimming strip 15 provides a neat finsh to the top of the front edge of the front cross-member 1 and the bezel 16. To the underside of the front cross-member 1 is secured a foam rubber cushion 13 which is sandwiched between the front cross-member 1 and a headlining 14.

Diposed within the front member 1 is a further part of the aforementioned mechanism for securing the cover in its closed position, this further part being in the form of a cam plate 25 rotatable by means of a handle (not shown) accessible from the underside of the front cross-member 1 and carried in a support 29. Manual rotation of the handle serves to rotate the cam plate 25 about axis X (see FIG. 1). A locking hook 24 is mounted on the cam plate 25 eccentrically b means of a shouldered screw 28. A flat coil spring 27 is provided for resiliently urging the locking hook 24 in an anti-clockwise direction as viewed in FIG. 1. Engaged with opposed cam surfaces on the cam plate 25 are inner ends of a pair of locking rods 30 which extend longitudinally of the cross-member 1. The rods 30 are provided with star washers 32 and are urged inwardly into engagement with the respective cam surfaces by means of compression springs 31 lodged between the star-washers 32 and respective support brackets 41 secured to the cross-member 1. Each rod 30 includes a portion 33 which is screw threaded to the remainder of the rod 30 and which has an outer end which can project laterally of the respective slide 39 to engage against the respective side rail 40. The effective length of each rod 30 can be adjusted by rotation of the portion 33 relative to the remainder of the rod 30 and a locking nut 34 is provided for locking the portion 33 in the desired position relative to the remainder of the rod 30.

Secured to the underside of the cover plate 7 is a pair of angle brackets 35 (only one shown) which are engaged with respective adjusting screws 37 engaged with nuts 36 permanently secured to the cross-member 1.

The forward end of the frame surrounding the opening 0 is defined by an apertured rail 17. Underneath the portion of the roof 18 adjacent the rail 17 there is provided a body stiffener 19 and a further rail 21 which is covered by a headlining 23 of the car roof. The rail 21 is apertured to receive the extensions of the lifting brackets 2 and the locking hook 24 as will be described hereinafter. Accommodated within the rail 21 are four spaced cam blocks 22 which are adjustably mounted on screw threaded rods 20 secured to the rail 21 but rotatable relative thereto. Cam blocks 22 are provided opposite the respective extensions of the lifting brackets 2. In use, with the flexible cover 9 folded back on itself so as to expose the opening 0, the folding roof assembly can be closed by pushing the front cross-member 1 forwardly by hand towards the position illustrated in FIG. 3. This movement serves to unfold the flexible cover 9, the cross-members sliding in the side rails 40. Until the flexible cover 9 is in the fully closed position (as illustrated in FIG. 3) the springs 3 and 5 urge the cover plate 7 and lifting brackets 2 upwardly into the position illustrated in FIG. 2. During this closing operation, the rods 30 are in a retracted condition, as will be described hereinafter. Also, the locking hook 24 is in a position in which it is extended further forwardly than the position shown in FIG. 1. When the front cross-member 1 is moved from the position illustrated in FIG. 2 to the position illustrated in FIG. 3, the locking hook 24 passes beyond the abutment at the front end of the opening 0, such movement being permitted by lateral pivotting of the hook 24 against the action of the coil spring 27. At the same time, the forward ends of the extensions of the lifting brackets 2 engage against the respective cam surfaces of the cam blocks 22. This causes the lifting brackets 2 to be forced downwardly against the action of lifting springs 3 and coil springs 5 so as to draw the cover plate 7 downwardly until the strip 8 is sealed firmly against the upper surface of the roof 18. In this position, the trimming strip 15 is engaged against the rail 17. The last closing movements of the cross-member 1 are effected by rotation of the cam plate 25 to the position illustrated in FIG. 1 so as to retract the locking hook 24 which engages against the back of the aforesaid abutment. When the cam plate 25 is in the position illustrated in FIG. 1, the cam forms on the cam plate 25 have urged the rods 30 outwardly against the action of respective springs 31 so that the outer ends of the portions 33 of the rods 30 engage against the respective side rail 40 to further lock the front channel member against rearward sliding movement. It is to be appreciated that downward movement of the cover plate 7 also provides a further tensioning effect on the cover 9. Thus, in the closed position, the opening 0 is closed by a cover which is taut and firmly secured against unwanted rearward movement, and that there is a close sealing of the front edge of the cover plate onto the roof 18 with the result that there is a minimum of risk of ingress of moisture and dirt and a minimum of wind noise.

When it is desired to open the folding roof assembly, the handle is rotated in order to move the cam plate 25 out of the position shown in FIG. 1. This releases the outward urging of the rods 30 which move inwardly under the action of the springs 31 so that the ends of the portions 33 of the rod 30 no longer frictionally engage the side rails 40. At the same time, the locking hook 24 is moved into a position in which it can clear the abutment. Following this, manual rearward sliding of the front cross-member 1 causes the downward pressure on the forward ends of the extensions of the brackets 2 by the inclined surfaces of the cam blocks 22 to be released so that the lifting springs 3 and coil springs 5 can urge the brackets 2, and thus the cover plate 7, upwardly into the position illustrated in FIG. 2. The cover 9 can be folded back until adjacent cross-members are in manual engagement. Operation of the handle to move the cam plate 25 back into its rotary position illustrated in FIG. 1 causes the rods 30 to be extended outwardly in the manner described previously to lock the front cross-member 1 against sliding movement. Thus, locking of the folding roof assembly in the open position of the flexible cover 9 can be effected. Additionally, it will be appreciated that the flexible cover 9 can be locked in any desired postion between fully open and fully closed positions merely by operating the handle to lock the ends of the portions 33 of the rods 30 against the respective side rails 40.

It will be manifest from the above description and from the drawings that the cover plate 7 is not operatively linked with the cam plate 25 so that rotary movement of the cam plate 25 does not automatically cause the top plate 7 to be moved out of its tilted position shown in FIG. 2. This is effected completely independently only when the flexible cover is moved into its closed position as a result of forward sliding movement of the cross-member 1. This separate operation of the top plate 7 and cam element 25 has the advantage that it permits ready independent adjustment of the locking action by the locking hook 24 and the tilting or pivotting action of the top plate 7. This facility for independently adjusting these two operations greatly facilitates correct fitting of the folding roof assembly into a vehicle. Adjustment of the tilting action of the cover plate 7 is possible by rotation of the screws 20 so that each of the cam blocks 22 can be adjusted independently whereby it can be ensured that the top plate 7 is properly sealed with the roof 18 along the whole of its length. Adjustment of the locking action by the locking hook 24 is possible by adjustment of the position of the abutment in the usual way for folding roof assemblies. The locking action of the rods 30 is readily adjustable for screwing the portions 33 in or out relative to the remainder of the rods 30 after release of the lock nuts 34. Tensioning of the cover is readily effected using screws 11 which, when released, allow the cover plate 7 to be moved fore and aft relative to the brackets 2. Tensioning of the cover 9 can also be controlled by adjustment of the position of the end of screws 37 relative to brackets 35.

We claim:

1. A folding roof assembly for closing an opening in a surface, said assembly comprising a flexible cover, cross-members slidable on guides extending along longitudinal side edges of the opening, the cross-members supporting the flexible cover so that the latter is movable between open and closed positions, and a mechanism carried by the front cross-member for securing the cover in its closed position and for tensioning the cover, said mechanism including (a) a relatively rigid member to which the front of the flexible cover is secured, said relatively rigid member being mounted for sliding movement with the front cross-member relative to the guides and for movement relative to the front cross-member towards and away from a sealed position in which the relatively rigid member is sealed against the surface of the front end of the opening when the front cross-member is adjacent the front end of the opening, (b) a manually operable retainer device which is engageable with an abutment at the front and of the opening to retain the cover in its closed position, and (c) at least one element to which the relatively rigid member is secured, said at least one element co-operating with a respective part at the front end of the opening during movement of the cover into its closed position to move the relatively rigid member into its sealing position.

2. An assembly as claimed in claim 1, wherein said at least one element and said respective part co-operate with one another with a camming action.

3. An assembly as claimed in claim 1, wherein a plurality of said elements are provided in spaced apart relationship longitudinally of the front cross-member.

4. An assembly as claimed in claim 1, wherein each said respective part provides a cam surface and each element provides the cam follower engageable with said cam surface.

5. An assembly as claimed in claim 1, wherein the relatively rigid member is mounted on the front cross-members through the intermediary of said at least one element.

6. An assembly as claimed in claim 1, wherein each said respective part is adjustable in position relative to the opening.

7. An assembly as claimed in claim 1, wherein the manually operable retainer device is also arranged to cause at least one locking member to project from the cross-member laterally of the opening to permit the cover to be locked against movement whereby, if desired, the cover can be locked in its open position or in a position intermediate its open and closed positions.

8. An assembly as claimed in claim 7, wherein the or each locking member comprises a rod which extends longitudinally of the cross-member and is slidable relative thereto,,the rod having an inner end engaged with a cam movable by the manually operable retainer device and an outer end which is engageable with a part on one of the longitudinal side edges of the opening.

9. An assembly as claimed in claim 8, wherein the or each rod is of adjustable length.

10. An assembly according to claim 3, wherein at least one of said elements is disposed intermediate the ends of the front cross member.

11. An assembly according to claim 1, wherein at least one of said elements comprises an elongated bracket and includes means for resiliently mounting one end of said bracket to said cross member for conjoint movement therewith relative to said guide and for relative movement toward and away from said cross piece.

* * * * *